United States Patent
Knights et al.

(10) Patent No.: US 6,671,305 B2
(45) Date of Patent: Dec. 30, 2003

(54) SOLID STATE LASER

(75) Inventors: Mark Gregory Knights, Brookline, NH (US); Glen Allan Rines, Hollis, NH (US); Masayuki Karakawa, Marlborough, MA (US)

(73) Assignee: Corporation for Laser Optics Research, Portsmouth, NH (US)

(*) Notice: Subject to any disclaimer, the term of this patent is extended or adjusted under 35 U.S.C. 154(b) by 160 days.

(21) Appl. No.: 09/933,456

(22) Filed: Aug. 20, 2001

(65) Prior Publication Data

US 2002/0122455 A1 Sep. 5, 2002

Related U.S. Application Data (63) Continuation-in-part of application No. 09/319,058, filed as application No. PCT/US92/22066 on Nov. 28, 1997, now Pat. No. 6,304,237.
(60) Provisional application No. 60/226,180, filed on Aug. 18, 2000, and provisional application No. 60/032,269, filed on Nov. 29, 1996.

(51) Int. Cl.[7] .............................. H01S 3/08; G09G 3/00
(52) U.S. Cl. ............................................ 372/92; 345/30
(58) Field of Search ....................... 372/92, 100; 345/30

(56) References Cited

U.S. PATENT DOCUMENTS

| 5,084,888 | A | * | 1/1992 | Tajima et al. ................. 372/39 |
|---|---|---|---|---|
| 5,235,605 | A | | 8/1993 | Rines et al. ................... 372/20 |
| 5,305,345 | A | * | 4/1994 | Albrecht et al. ............... 372/69 |
| 5,315,612 | A | | 5/1994 | Alcock et al. |
| 5,799,032 | A | | 8/1998 | Hansson |
| 5,802,086 | A | | 9/1998 | Hargis et al. .................. 372/22 |
| 5,828,424 | A | | 10/1998 | Wallenstein ................. 348/760 |
| 5,894,489 | A | | 4/1999 | Halldorsson et al. |
| 6,002,695 | A | * | 12/1999 | Alfrey et al. .................. 372/22 |
| 6,157,663 | A | | 12/2000 | Wu et al. ....................... 372/75 |
| 2002/0105997 | A1 | * | 8/2002 | Zhang .......................... 372/70 |

FOREIGN PATENT DOCUMENTS

| EP | 0 831 567 B1 | 4/1997 | ............. H01S/3/06 |

OTHER PUBLICATIONS

Scheps, R. et al., "Internally Folded Nd:YAG and Nd:YVO$_4$ Lasers Pumped by Laser Diodes", IEEE J. Quantum Elec. 30 (9): 2132–2135 (1994).

* cited by examiner

*Primary Examiner*—Paul Ip
*Assistant Examiner*—Jeffrey N Zahn
(74) *Attorney, Agent, or Firm*—Ropes & Gray LLP (57) ABSTRACT

The invention is directed to a compact optically side-pumped solid-state laser with an optimized overlap between the mode of the laser beam propagating in the laser material and the pump beam. Using a common pump volume, the compact solid-state laser can simultaneously emit laser beams at different wavelengths. The laser can be combined with nonlinear optical elements to provide a RGB three color laser architecture suitable for color projection display applications.

9 Claims, 8 Drawing Sheets

SOLID STATE LASER

CROSS-REFERENCE TO OTHER PATENT APPLICATIONS

This application is a continuation-in-part of U.S. application No., 09/3 19,058, filed May 27, 1999, now U.S. Pat. No. 6,304,237, which is the National Stage of PCT/US97/22066, filed Nov. 28, 1997, which claims the benefit of U.S. provisional Application No. 60/032,269, filed Nov. 29, 1996. This application also claims the benefit of U.S. provisional Application No. 60/226,180, filed Aug. 18, 2000, all of which are incorporated herein by reference.

FIELD OF THE INVENTION

The invention relates to a compact optically side-pumped solid-state laser, and more particularly to a laser that can simultaneously emit laser beams at different wavelengths. The invention also relates to a compact three color (RGB) laser architecture suitable for color projection display applications.

BACK GROUND OF THE INVENTION

Red, green and blue (RGB) lasers offer demonstrable benefits over incandescent light sources for high-performance imaging applications. Greater color saturation, contrast, sharpness, and color-gamut are among the most compelling attributes distinguishing laser displays from conventional imaging systems employing arc lamps. Any desired color within the CIE or NTSC color space can be obtained by appropriately mixing the primary colors R, G, and B. An ideal laser light source for projection display applications should provide multi-watt R, G, and B outputs, either cw or Q-switched at high repetition rates for frequency mixing.

A RGB laser light source display system has been disclosed, for example, in commonly assigned U.S. patent application Ser. No. 09/319,058, which is incorporated herein by reference. As disclosed in the reference, a Nd:YVO$_4$ MOPA laser source emits fundamental laser radiation at 1.064 $\mu$m, which is frequency-doubled to produce green, whereas red and blue are produced R, G and B are generated by sum-frequency generation (SFG) and/or frequency-doubling using radiation produced by an OPA and Ti:sapphire laser pumped at the 1.064 $\mu$m fundamental wavelength. Nd:YVO$_4$ is a laser material with a low lasing threshold and a high slope efficiency, a large stimulated emission cross-section, and a high coefficient of absorption over a wide pumping wavelength bandwidth of 802 to 820 nm. The high absorption of pump radiation makes Nd:YVO$_4$ suitable for side-pumping with diode lasers instead of end pumping.

In a side-pumped configuration, the direction of pumping is transverse or orthogonal to the longitudinal axis of the laser cavity. Considerable care must be taken to ensure that there is a high degree of overlap between the laser mode and the pumped volume. The absorption depth of the pump light depends on the concentration of Nd-atoms in the crystal, so that the conversion efficiency of the laser can be optimized by using a low absorption material with a large mode volume. The absorption coefficient can be controlled by adjusting the concentration of Nd-atoms in Nd:YVO$_4$.

Nd$^{3+}$-ions can lase not only at the $^4F_{3/2} \rightarrow ^4I_{11/2}$(1.064 $\mu$m) transition, but also, albeit somewhat less efficiently, at the $^4F_{3/2} \rightarrow ^4I_{13/2}$(1.342 $\mu$m) transition. One of these transitions can be favored over the other by a suitable cavity design. Blue emission can be generated from the 1.342 $\mu$m fundamental by second harmonic generation (SHG) of 670 nm radiation which is then combined (SFG) with the 1.342 $\mu$m residual to produce 447 nm blue emission. Green emission at 532 nm can be produced from the 1.064 $\mu$m fundamental by SHG. Red emission at 628 nm can be produced from the 1.064 $\mu$m fundamental by first shifting 1.064 $\mu$m to 1.54 $\mu$m using an OPO, followed by SHG.

It would therefore be desirable to provide an efficient side-pumped solid state laser configuration with a high degree of spatial overlap between the region of highest gain and the laser mode. It would also be desirable to provide a compact laser configuration emitting at two different wavelengths that can be used for efficiently generating the three primary colors R, G and B, for example, by nonlinear optical processes.

SUMMARY OF THE INVENTION

The invention is directed to a compact solid-state laser with an optimized spatial overlap between the mode of the laser beam propagating in the laser material and the pump beam.

According to aspect of the invention, a slab-type solid-state laser oscillating device includes a slab-type laser medium for generating at least two laser beams which traverse the laser medium between two end faces in a longitudinal direction. The laser medium is optically transversely pumped. At least one of the end faces has Brewster surfaces which are cut at an angle with respect to the longitudinal direction, intersect along a line, wherein the angle is equal to a Brewster angle of the laser medium for the laser beams. A partially reflecting mirror and a high-reflectivity mirror form an optical cavity. Each of the laser beams passes through a different Brewster surface and the laser beams are simultaneously optically pumped.

Embodiments of the invention may include one or more of the following features. At least one high-reflectivity mirror can be obliquely disposed and offset from a longitudinal center axis of the slab-type laser medium. The laser beams passing through the Brewster surface can have the same or a different lasing wavelength. A fold prism can be disposed at the end of the slab-type laser medium opposite the Brewster surfaces, wherein the fold prism retro-reflects the laser beam passing through one of the Brewster surfaces to subsequently pass through another Brewster surface. The laser medium may be Nd:YVO$_4$ or Nd:YAG with lasing wavelengths of approximately 1.06 $\mu$m and 1.34 $\mu$m.

According to another aspect of the invention, a compact multi-wavelength solid state laser has a solid state laser element made of a material capable of lasing at at least two wavelengths. The solid state laser defines a center line and has opposing side faces extending substantially parallel to the center line, with pump radiation coupled to the side faces. The solid state laser element further includes end faces, with at least one of the end faces comprising a Brewster dispersing prism with twin exit faces formed on opposite sides of the center line of the solid state laser element. Two laser cavities are formed on opposite sides of the center line, with a first cavity including a first mirror having a high reflectivity at a first of the at least two wavelengths, a first output mirror, and a first portion of the solid state laser element with one of the twin faces of the Brewster dispersing prism, and the second cavity including a second mirror having a high reflectivity at a second of the at least two wavelengths, a second output mirror, and a second portion of the solid state laser element with the other twin face of the Brewster dispersing prism.

Embodiments of the invention may include one or more of the following additional features. At least one modulator, for example, a Q-switch, may disposed in one or several of the laser cavities. The Brewster dispersion prism can be formed integrally with or as a separate element from the solid state laser element. If the Brewster dispersion prism is formed as a separate element, a quarter-wave plate can be interposed between the Brewster dispersion prism and the end face of the solid state laser element. The Brewster dispersion prism can be formed of glass or another material transparent at the wavelengths produced by the solid state laser element.

The laser output beams having at least one of the lasing wavelengths of approximately 1.06 µm and 1.34 µm can be converted to RGB output beams useful, for example, in color projection display applications by employing at least one of an optical parametric oscillator, second harmonic generator and sum frequency mixer.

According to still another aspect of the invention, a compact side-pumped solid state laser includes a solid state laser element that defines a longitudinal center line and has opposing side faces extending substantially parallel to the center line, with pump radiation coupled to the side faces. The solid state laser element further includes end faces, with one of the end faces comprising a Brewster dispersing prism with twin exit faces formed on opposite sides of the center line of the solid state laser element, and with the other end face comprising a 180° fold prism. A laser cavity includes a high-reflectivity mirror obliquely disposed and offset to one side of the center line, a semitransparent output mirror obliquely disposed and offset to the other side of the center line, and the solid state laser element. The laser beam traverses a first portion of the solid state laser element in a first direction and a second portion of the solid state laser element in a second direction substantially opposite to and parallel to the first direction.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

The invention is directed to a compact solid-state laser with an optimized overlap between the mode of the laser beam propagating in the laser material and the pump beam. The invention is also directed to a compact solid-state laser that can simultaneously emit laser beams having different wavelengths. The laser can be employed in a RGB three color architecture suitable for color projection display applications.

Figure 1:
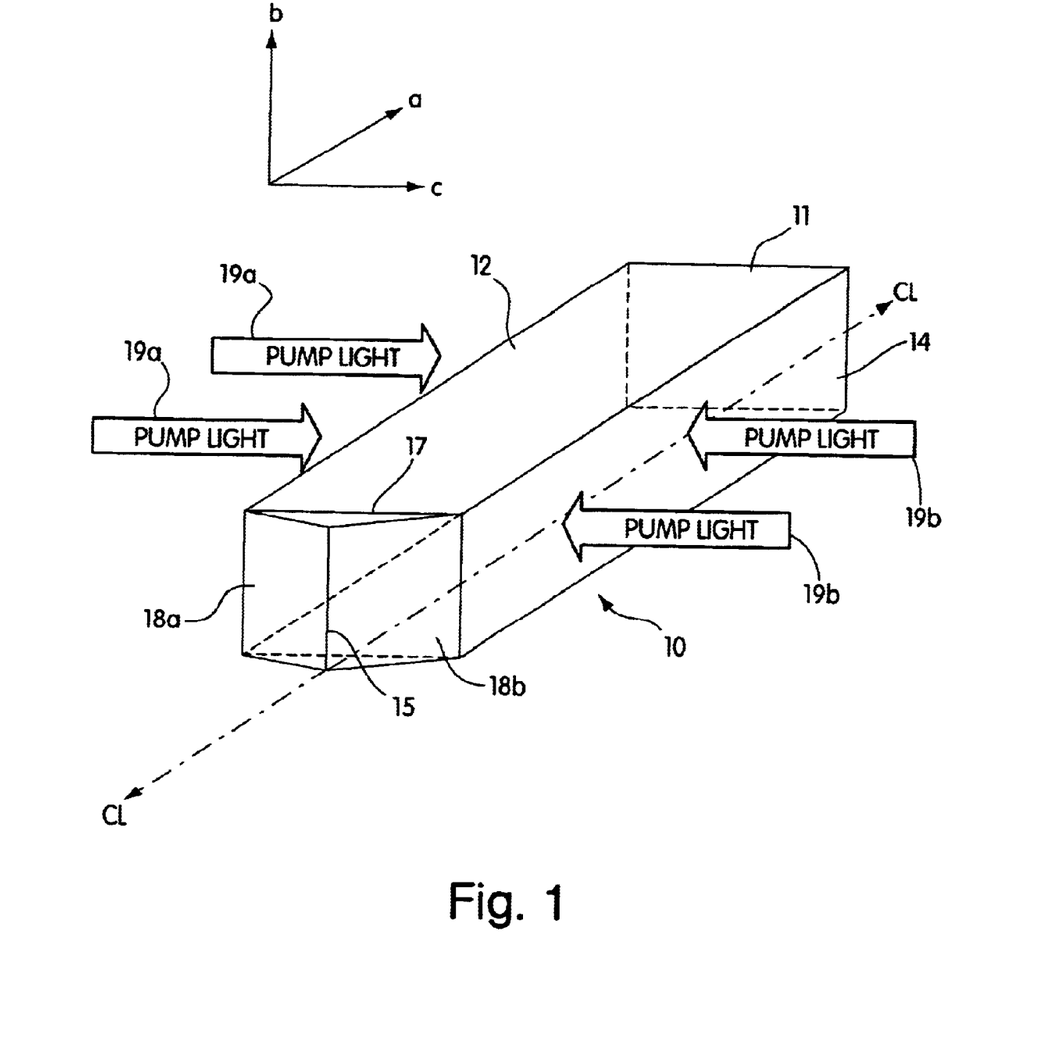
FIG. 1 is a perspective view of a solid state laser crystal with twin Brewster end faces.

Referring first to FIG. 1, an exemplary solid-state laser material, for example a $Nd:YVO_4$ crystal 10, is cut in the shape of a parallelepiped and optically side-pumped from two sides by pump light 19a, 19b entering the crystal 10 at opposing lateral faces 12, 14. In a suitable cavity (see FIGS. 3–6), laser radiation stimulated by the pump light 19a, 19b propagates in the crystal 10 parallel to the longitudinal centerline CL. The exemplary crystal 10 has a rear end face 16 and twin front end faces 18a, 18b, which are cut at a Brewster angle θ with respect to an imaginary plane 17 extending parallel to the end face 16. The twin front end faces 18a, 18b intersect at intersection line 15 which is perpendicular to the longitudinal centerline CL. The significance of the Brewster angle will be discussed below.

As known from electromagnetic theory, the reflection and refraction of light at an interface formed by two media with different indices of refraction depends on the polarization state of the incident radiation. If light is incident under an angle $\theta_i$, wherein $\tan(\theta_i)=n_2/n_1$, with $n_1$, $n_2$ representing the indices of refraction of the first and second medium, respectively, then the electric vector of the reflected light has no component in the plane of incidence. The angle $\theta_i$ is referred to as Brewster angle. The index of refraction of undoped $YVO_4$ is approximately equal to $n_o=2$ for the ordinary beam and $n_e=2.16$ for the extraordinary beam, substantially independent of wavelength in the wavelength range of interest. The Brewster angle inside the $YVO_4$ crystal for light exiting the prism is therefore approximately $\theta_i=26.6°$.

Also indicated schematically in FIG. 1 are the crystal axes of the $Nd:YVO_4$ crystal. $YVO_4$ belongs to the point group $D_{4h}$ and has lattice constants a=b=7.118 Å and c=6.294 Å. In $Nd:YVO_4$, the highest gain laser transitions at both 1.06 µm and 1.34 µm occur for polarization of the laser emission parallel to the crystal c-axis. The reflection loss at the Brewster faces 18a, 18b vanishes when the high gain lasing polarization vector is in the p-orientation with respect to the Brewster faces 18a, 18b. Accordingly, to minimize the reflection losses in a configuration where the Brewster faces are fabricated on the crystal itself, the c-axis of $Nd:YVO_4$ crystal should be oriented perpendicular to the centerline CL and perpendicular to the line of intersection 15 of the Brewster surfaces 18a, 18b.

However, $Nd:YVO_4$ is known to have a large temperature-dependent birefringence. This temperature dependent birefringence has been reported to create a strongly aberrated (distorted) thermal lens because the temperature-dependent index of refraction (dn/dT) in $Nd:YVO_4$ has a lower value in the direction parallel to the c-axis that in the direction parallel to the a-axis. It may therefore be desirable from a thermal management standpoint to orient the c-axis of the crystal parallel to the line of intersection of the Brewster surfaces. Since cooling, for example by employing thermoelectric coolers, is most conveniently applied to the top and bottom surfaces 11, 13 of the crystal 10, heat flow can be optimized and thermal lensing minimized if the c-axis is oriented parallel to the line of intersection 15 of the Brewster surfaces 18a, 18b.

Figure 2:
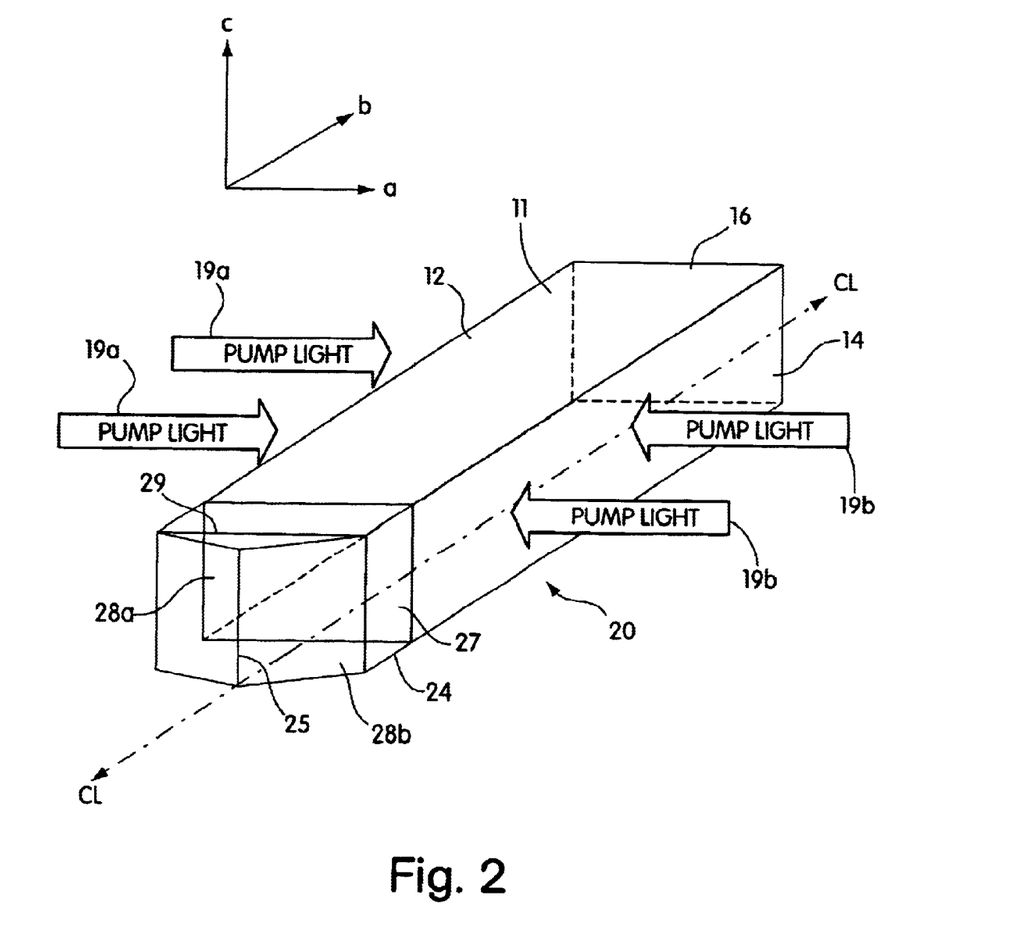
FIG. 2 is a perspective view of another embodiment of a solid-state laser crystal with twin Brewster end faces.

An embodiment with the c-axis parallel to the line of intersection 15 is depicted in FIG. 2. In this case, however, the lasing polarization becomes s-oriented with respect to the Brewster surfaces 18a, 18b. As also known from electromagnetic theory, the intensity of reflected s-polarized light is always greater than $((n-1)/(n+1))^2$, with $n=n_2/n_1$, making the associated reflection loss unacceptably large. In this case, a separate Brewster prism 29 can be formed, and a half-wave plate 27 can be inserted between the crystal 20 and the separate Brewster prism 29 to rotate the polarization direction by 90°. The laser beam impinging on the Brewster surfaces 28a, 28b is then again p-polarized with respect to the respective Brewster surface and, like in the embodiment depicted in FIG. 1, has a low loss. The separate prism may be optically contacted or anti-reflection coated and placed in physical proximity to an end face 27 of the crystal 20. The Brewster angle for a glass prism ($n \approx 1.5$) is approximately 33.7° versus 26.6° for the integral Nd:YVO$_4$ prism.

Figure 6:
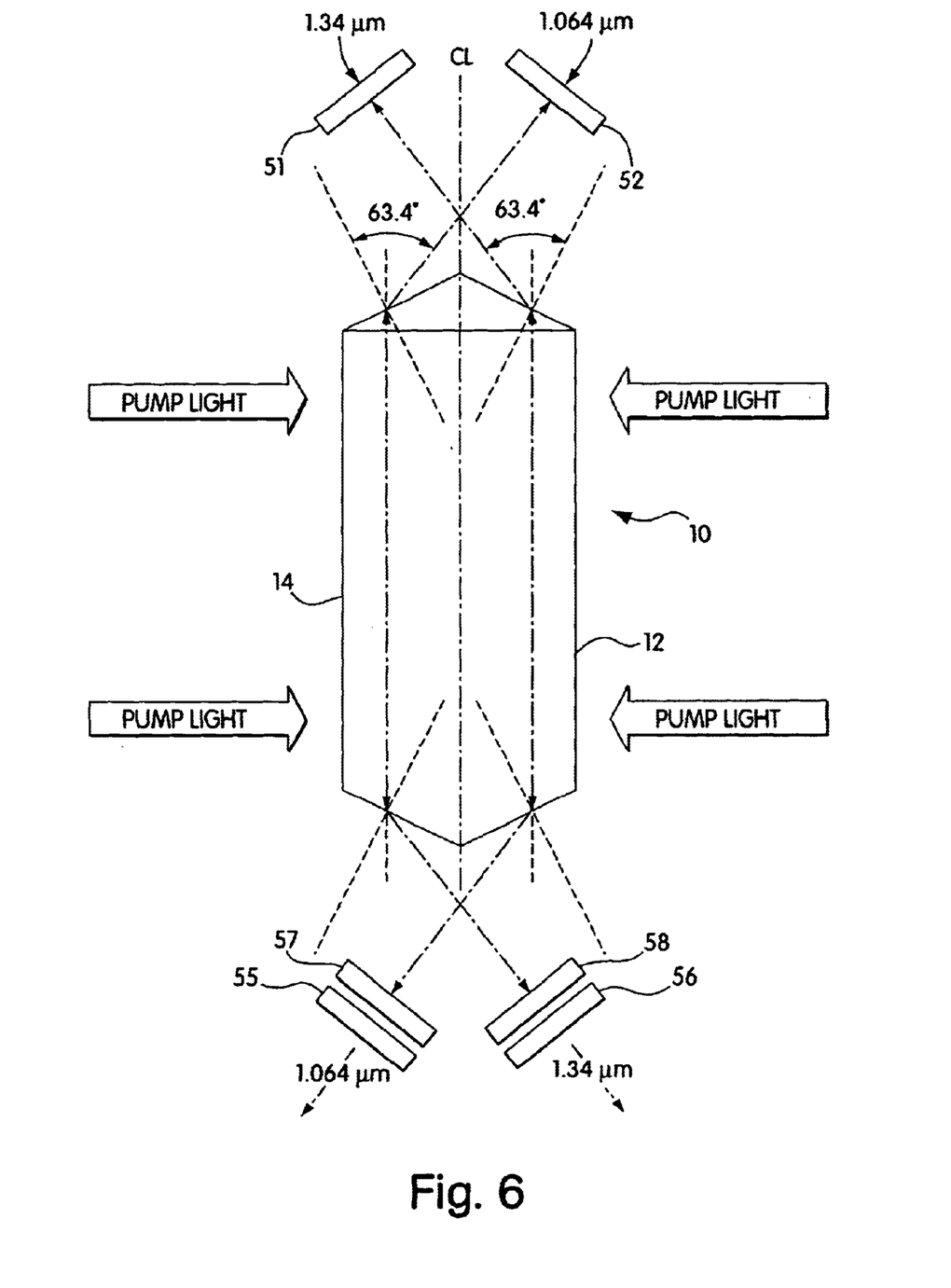
FIG. 6 is a schematic top view of yet another embodiment of a dual-wavelength solid state laser.
Figure 7:
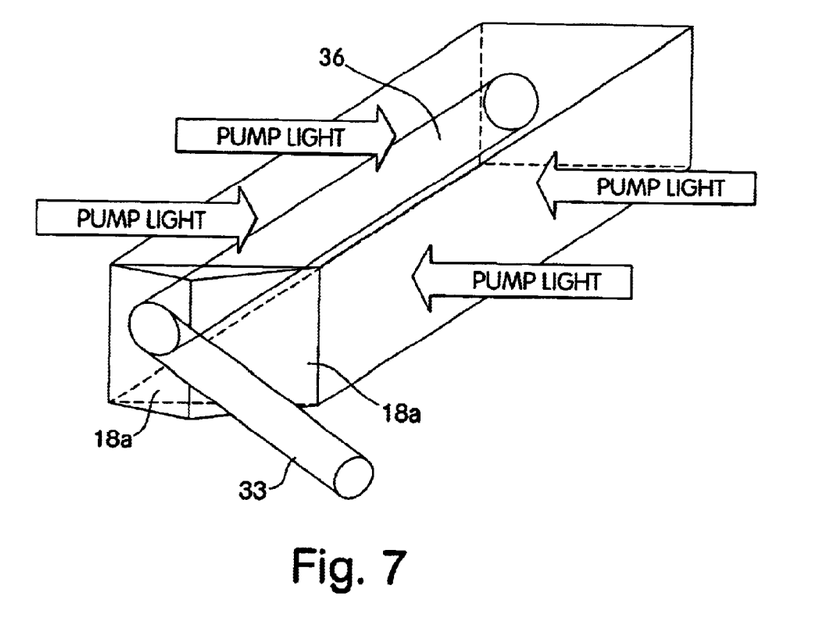
FIG. 7 is a schematic perspective view depicting the anamorphic expansion of a laser beam entering the solid state laser crystal of FIG. 1 at the Brewster surface.
Figure 8:
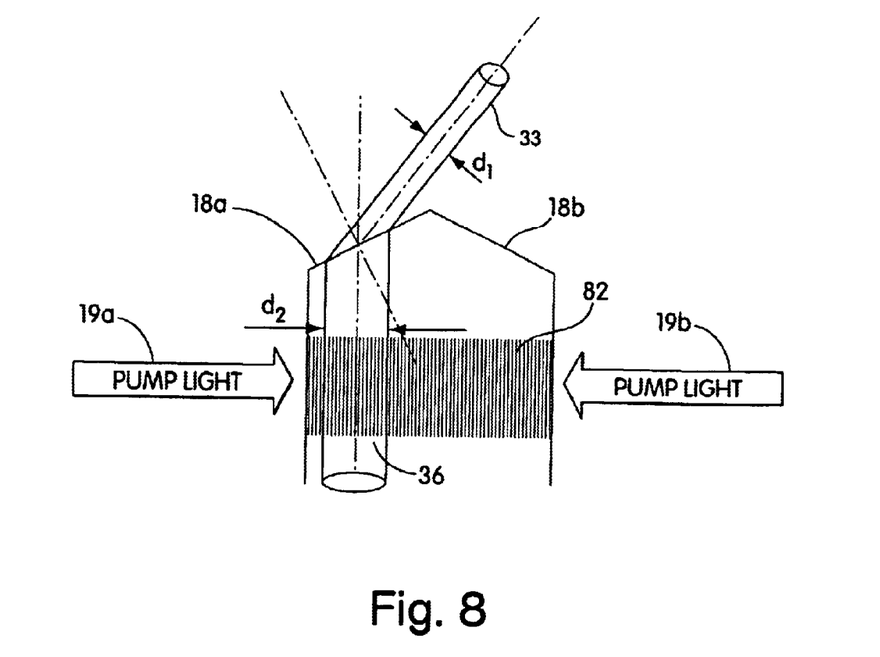
FIG. 8 is a schematic top view of the laser beam of FIG. 7.

As seen in FIGS. 1–8 and described above, the crystal 10, 20 is preferably transversely pumped, for example, from two sides 12, 14 by linear diode arrays equipped with a fast axis collimation (not shown). The pump diodes can be placed in an optical cavity to enhance conversion efficiency. As schematically indicated in FIG. 8, the collimated arrays produce sheets of pump light which enter the crystal through the lateral opposing faces 12, 14, and establish a corresponding sheet 82 of stored energy/gain in the crystal. The primary reasons for the use of Brewster surfaces are twofold: (1) to provide anamorphic beam expansion; and (2) to angularly separate beam lines external to the crystal.

Anamorphic beam expansion provides a better match between the circular beam 33 (FIGS. 7 and 8) outside the crystal and the rectangular cross-section gain sheet 82 inside. In a transversely diode-pumped geometry, pump power is deposited in a volume within the laser crystal defined by the absorption coefficient of the Nd:YVO$_4$ crystal. While transverse pumping is simple and utilizes the simplest, least costly diode arrays, the rectangular cross-section presents difficulties in efficient extraction of the pump power, since the circular cross-section of the laser beams propagating in the crystal typically does not efficiently overlap the rectangular cross-section of the deposited pump power. The anamorphic beam expansion provided by Brewster surfaces increases the width of the beam internal to the crystal, with the increase in width being equal to the index of refraction of the crystal (approximately 2 in the case of YVO$_4$). This expansion occurs in the plane of incidence/reflection, which coincides with the propagation direction of the pump beams, i.e., the long dimension of the rectangular pumped volume cross-section.

FIGS. 7 and 8 depict the anamorphic beam expansion of a laser beam propagating in the exemplary Nd:YVO$_4$ crystal of FIG. 1. The width of the laser beam 33 in free space is $d_1$, with the laser beam 36 being expanded to a width $d_2$ inside the crystal. $d_1$ and $d_2$ are related by the expression $d_2=d_1*\tan(63.4°)$, assuming $n_2=2$ for the refractive index of Nd:YVO$_4$. In other words, the laser beam inside the Nd:YVO$_4$ crystal has approximately twice the width of the laser beam in air, which translates into a greater utilization of the laser pump power (approximately also be a factor of 2). With the laser beams now able to take up a larger volume inside the crystal, the Nd doping level can also be reduced compared to conventional side-pumped lasers.

For sake of simplicity, only one laser beam propagating in the crystal is shown in FIGS. 7 and 8. However, with the pump light being able to traverse the entire width of the crystal, the conversion efficiency of pump light into laser light can be increased even further by propagating in the crystal two laser beams which are spaced substantially symmetrically from the centerline CL. It will be understood that the symmetry of the design is merely a result of the exemplary symmetric placement of the Brewster surfaces and should in no way be seen as limiting the scope of the invention.

Figure 3:
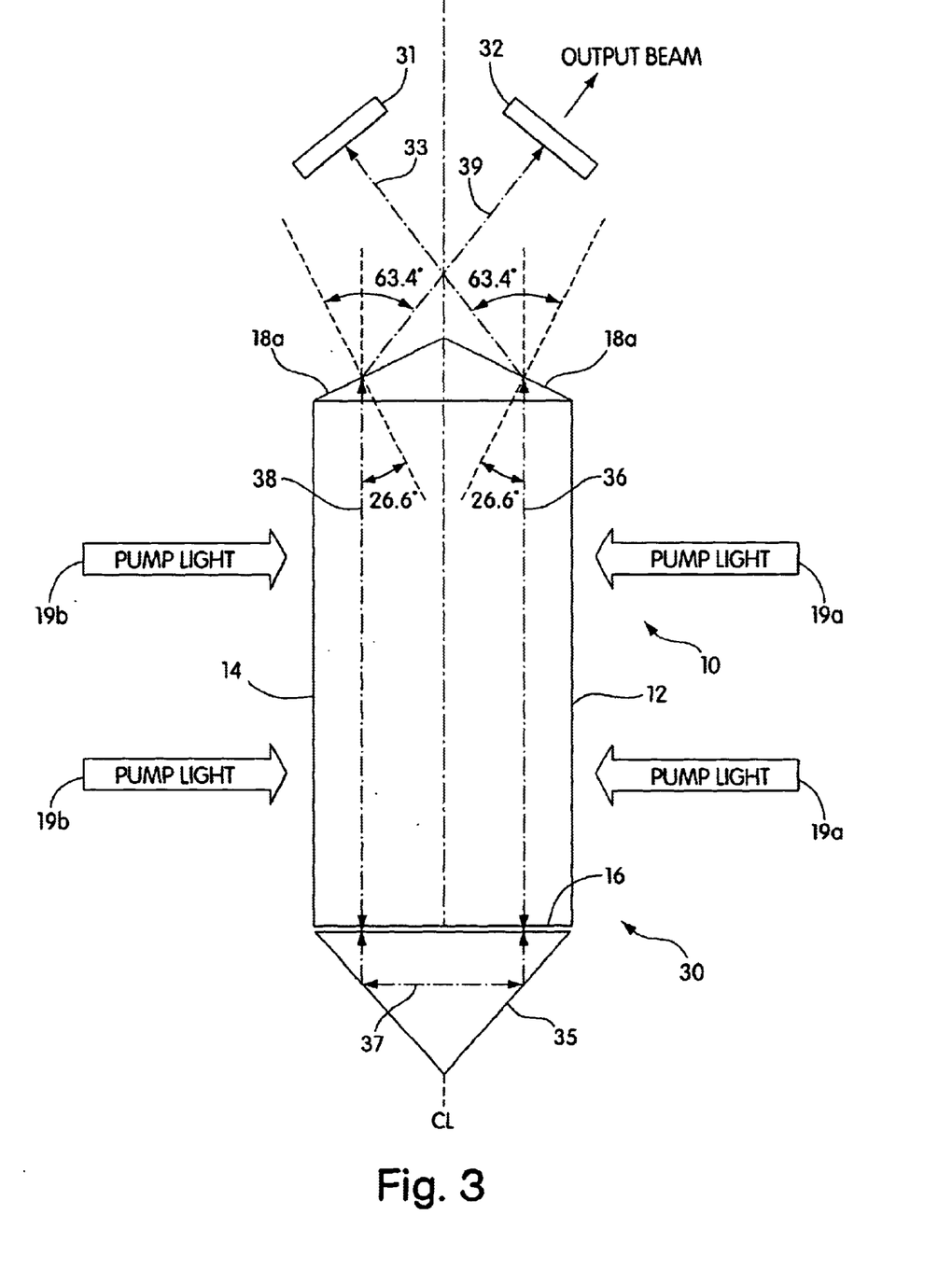
FIG. 3 is a schematic top view of an embodiment of a single wavelength laser using the solid state laser crystal of FIG. 1.
Figure 4:
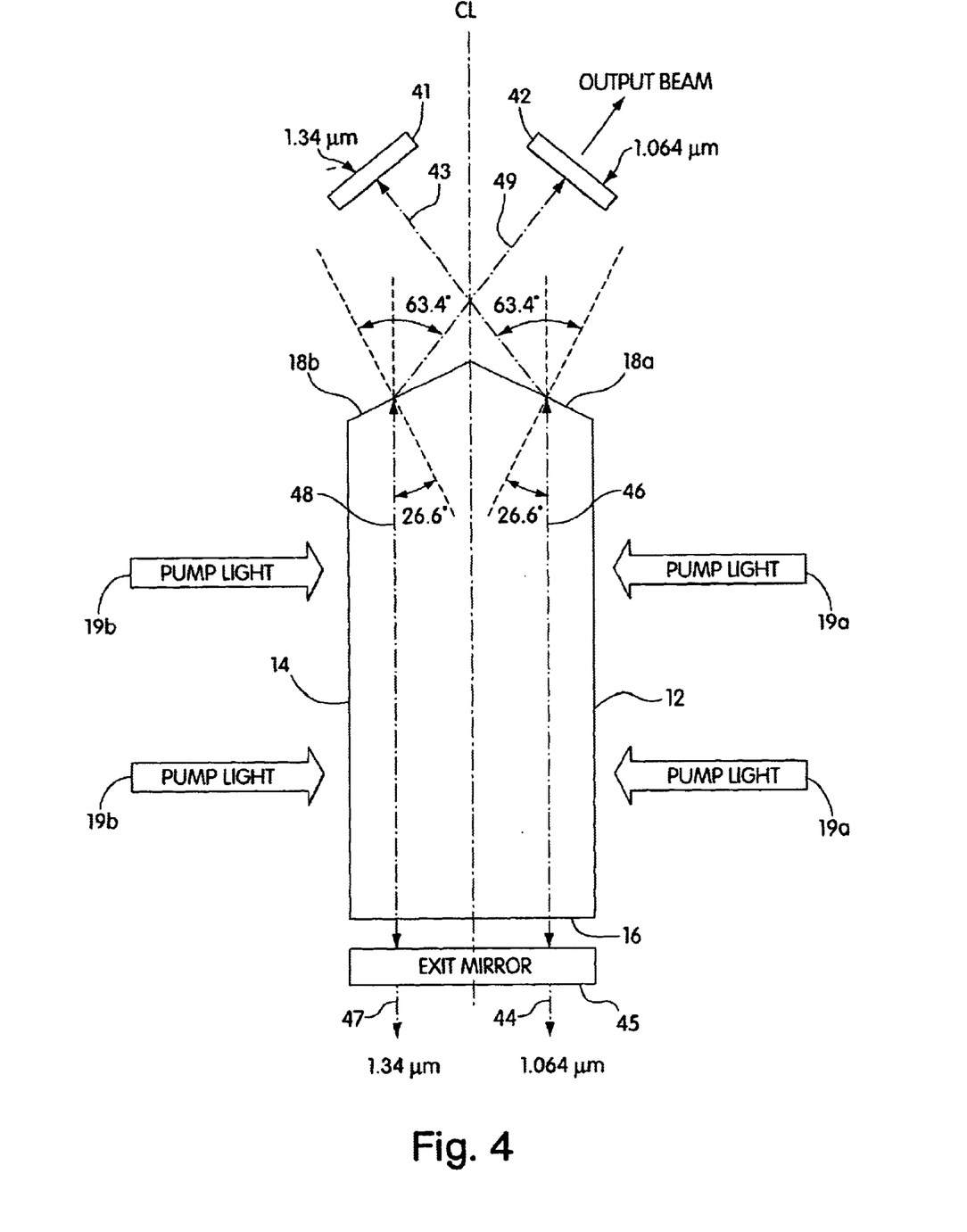
FIG. 4 is a schematic top view of an embodiment of a dual-wavelength solid state laser.
Figure 5:
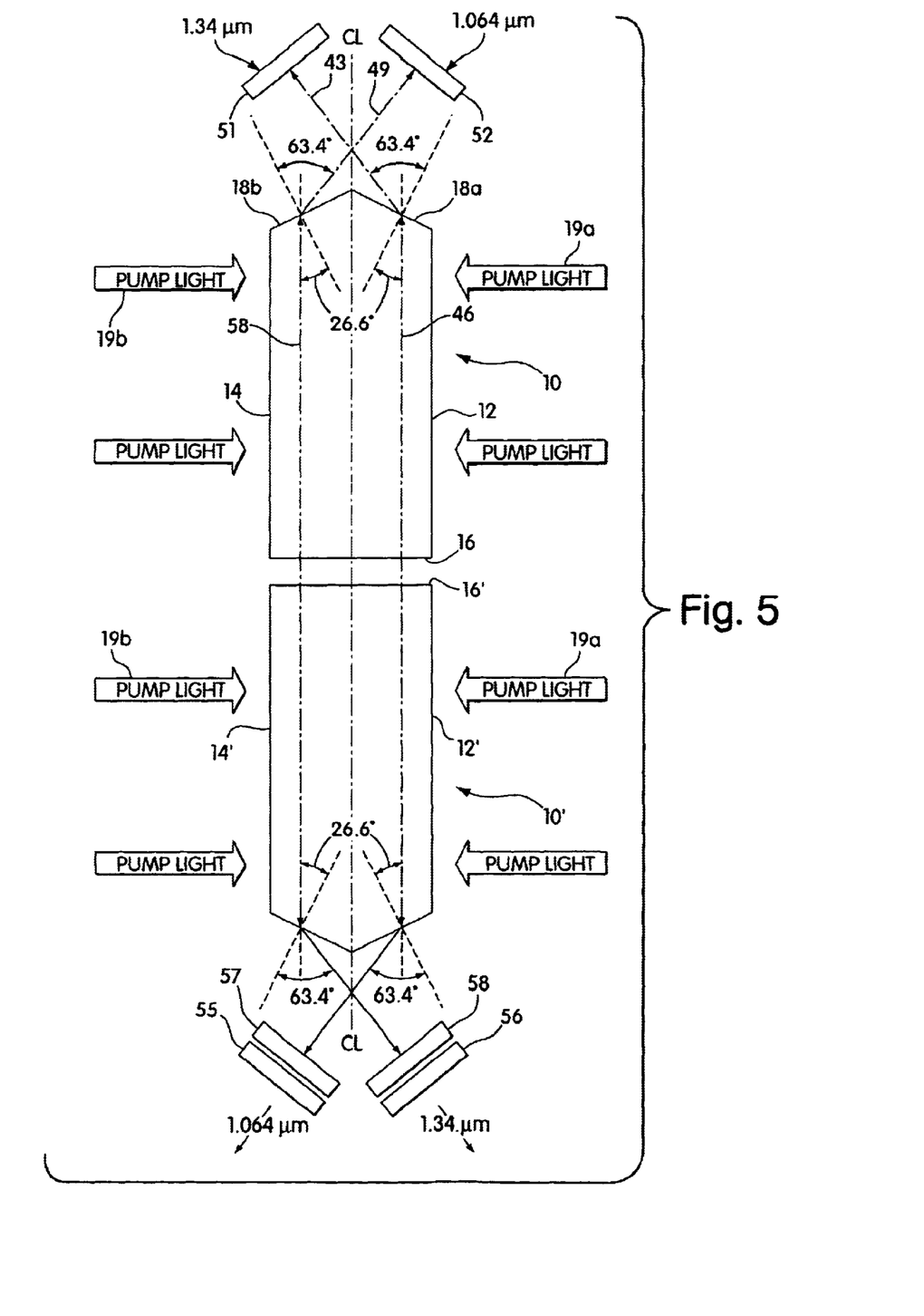
FIG. 5 is a schematic top view of another embodiment of a dual-wavelength solid state laser.

Referring now back to FIGS. 3–6, a Nd:YVO$_4$ crystal with twin Brewster surfaces according to the invention can be used in at least two different applications: (1) for efficiently producing laser emission at a single wavelength by folding the laser beam back into the laser cavity, as illustrated in FIG. 3; and (2) for producing laser emission simultaneously at two different wavelengths within the gain curve of the Nd:YVO$_4$ crystal, such as 1.064 μm and 1.34 μm, as illustrated in FIGS. 4–6.

As depicted in FIG. 3, a laser cavity 30 is formed between a high-reflectivity (HR) mirror 31 and a exit mirror 32 which is semi-transparent for the laser wavelength. A laser beam 33, which can be a circular beam, is reflected at the HR mirror 31 and then refracted at the first Brewster surface 18a. The refracted laser beam 36 propagating inside the laser crystal 10 has an increased width, as described above, and efficiently converts pump light 19a into laser light. Beam 36 then passes through the flat end face 16 of the laser crystal 10 and enters the fold prism 35, where the beam 37 is retroreflected back into the laser crystal 10, now represented by laser beam 38. Laser beam 38 traverses the laser crystal 10 towards the other Brewster surface 18b, while converting the pump light 19b entering through lateral crystal face 14 into laser light. The beam 38 is refracted again at the Brewster surface 18b, exiting as beam 39, with a portion of the beam 39 passing through the exit mirror 32 to form the useful laser output beam. In the exemplary embodiment with integral Nd:YVO$_4$ twin Brewster surfaces 18a, 18b, the beams 33 and 39 enclose an angle of 73.6° therebetween. This design represents a simple, compact and efficient side-pumped laser source emitting a single wavelength, for example, 1.064 μm for Nd:YVO$_4$.

The fold prism depicted in FIG. 3 can be made of glass or any other material that is substantially transparent at the wavelength of the laser radiation. Since an index discontinuity at the glass- Nd:YVO$_4$ crystal interface produces optical losses, the fold prism and/or the Nd:YVO$_4$ crystal surface facing the prism are preferably AR-coated. The high-reflectivity mirror and the exit mirror can be of conventional design and can include reflective metal or dielectric layers, such as a dielectric stack optimized for the particular wavelength. The large angular beam separation allows placement of additional optical elements in the beam path, such as an acousto-optic Q-switch, as described below.

As discussed above, Nd-atoms can lase at at least two different wavelengths, for example, $\lambda_1$=1.064 μm and $\lambda_2$=1.34 μm. The lasing crystal with the twin Brewster surfaces 18a, 18b hence can simultaneously support two independent laser beams at two different wavelengths.

In an embodiment for dual-wavelength emission depicted in FIG. 4, two HR mirrors 41, 42 are located on either side of the centerline CL, with the first mirror 41 having a high reflectivity at a first wavelength (1.064 μm) and the second mirror 42 having a high reflectivity at the second wavelength (1.34 μm). A common exit mirror 45 or separate exit mirrors (not shown) with a relatively flat reflectivity response curve over the wavelength range between $\lambda_1$ and $\lambda_2$ can be placed near the end face 16 of the Nd:YVO$_4$ crystal 10 opposite the Brewster surfaces 18a, 18b. Accordingly, a first laser cavity of system 40 is formed between the high-reflectivity mirror 41 and the exit mirror 45 for 1.064 µm laser emission, and a second laser cavity is formed between the high-reflectivity mirror 42 and the exit mirror 45 for 1.34 µm laser emission. The two cavities share the common pump volume between lateral faces 12, 14. A laser beam 43, which can be a circular beam, is reflected at the HR mirror 41 and then refracted at the first Brewster surface 18a. The refracted laser beam 46 propagating inside the laser crystal 10 has an increased width, as described above, and efficiently converts pump light 19a into laser light. Beam 46 then passes through the flat end face 16 of the laser crystal 10 and partially through the exit mirror 45 to form the useful laser output beam 44. Laser beam 47 at the other wavelength is produced in a similar manner.

In the embodiment of FIG. 4, the end face of the Nd:YVO$_4$ crystal opposite the Brewster surfaces is planar, producing two substantially parallel laser output beams. Because of the close proximity of the mutually parallel output beams 44, 47, it is difficult to place additional optical elements, such as Q-switches and modulators, in the path of the laser beams.

Referring now to FIG. 5, the output beams 44, 47 can be angularly separated by mounting two Nd:YVO$_4$ crystals 10, 10' of the type shown in FIG. 4, but without the exit mirror 45, with their long axes aligned along the common centerline CL and respective flat end faces 16, 16' facing each other. The crystals 10, 10' can be mounted, for example, on a common heat sink (not shown). This arrangement is advantageous if longer Nd:YVO$_4$ crystals with controlled doping are unavailable. A first laser cavity is formed between the high-reflectivity mirror 51 and the exit mirror 55 for 1.064 µm laser emission, and a second laser cavity is formed between the high-reflectivity mirror 52 and the exit mirror 56 for 1.34 µm laser emission. The angular spread (in the illustrated example 73.6°) between the output beams provides space for placement of additional optical elements, such as Q-switches 57, 58 which increase the peak power for nonlinear frequency conversion. The end faces 16, 16' should be placed close to one another and AR coated.

The gap between the crystals 10, 10' can be eliminated and a single Nd:YVO$_4$ crystal with Brewster surfaces disposed on both end faces can be used, if longer Nd:YVO$_4$ crystals of controlled quality become available. This embodiment is illustrated in FIG. 6. In all other aspect, the embodiment of FIG. 6 is identical to that of FIG. 5.

It will be understood that a separate prism and a quarter-wave plate interposed between the prism and a flat end face of the Nd:YVO$_4$ crystal can be employed in lieu of the Brewster surfaces formed integrally with the crystal to reduce thermal lensing effects, as discussed above with reference to FIG. 2. This will produce a different Brewster angle between the Brewster surface and the flat end face of the crystal, depending on the material used for the prism (for example, approximately 35° for glass versus 26.6° for YVO$_4$). Likewise, the anamorphic increase in beam width will also be different, scaling approximately with the refractive index of the prism material.

Figure 9:
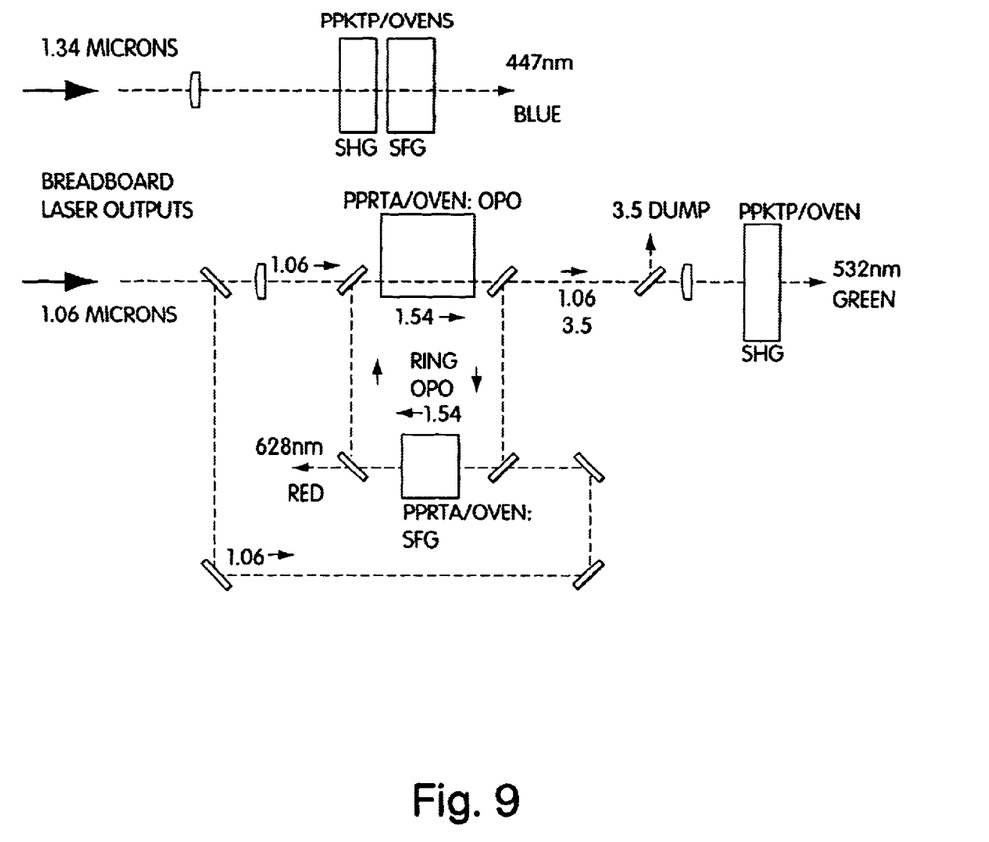
FIG. 9 depicts schematically a process for generating R, G and B using two wavelengths.

Referring now to FIG. 9, nonlinear wavelength shifting is employed to convert the 1.06 µm and 1.34 µm laser outputs to the visible lines (RGB) at 628, 532 and 447 nm, respectively, suitable for laser projection display applications. For efficient nonlinear wavelength shifting, the proposed system uses periodically-poled (PP) nonlinear (NL) materials, such as potassium-titanyl phosphate (KTP), lithium niobate (LN), and rubidium-titanyl arsenate (RTA). In PPNL materials, a spatially modulated electric field is used to generate controlled periodic variations in the index of refraction along the axis of beam propagation. In each case, the periodicity of the poling (physical spacing of the poled domains with variation in the index-of-refraction) is adjusted to achieve phase matching at the specific wavelength associated with a given nonlinear step. Some of these materials have to be maintained slightly above ambient temperature (40° C. is typical) which advantageously only requires small ovens.

As seen in FIG. 9, blue output at 447 nm can be obtained by first generating the second harmonic (SHG) of the 1.34 µm fundamental wavelength at 670 nm using a PPKTP crystal. The 670 nm harmonic is then combined with the residual 1.34 µm fundamental by sum frequency generation (SFG), producing the blue output beam at 447 nm. PPKTP is a well-developed material for this application, although output power may be limited by residual absorption in the blue.

In the exemplary embodiment of FIG. 9, both red (628 nm) and green (532 nm) output beams can be produced from the 1.06 µm fundamental wavelength. The red output can be produced by first shifting the 1.06 µm fundamental to 1.54 µm using an optical parametric oscillator (OPO). Both PPRTA and PPLN are well-developed material systems for this application. SFG of the shifted 1.54 µm with the residual 1.06 µm fundamental produces 628 nm. PPKTP is a preferred material for this particular sum frequency generation. In the embodiment depicted in FIG. 9, the OPO is implemented as a ring structure which allows the SFG crystal to be placed inside the OPO cavity for the purpose of enhancing peak power. However, in an alternate embodiment (not shown), the OPO and/or SFG crystals can also be placed outside the cavity.

When the red beam is produced in the aforedescribed matter, green output can be obtained by SHG of the 1.06 µm fundamental which is residual from the OPO generation of the 1.54 µm that was used for producing the red beam. The 3.5 µm idler output from the OPO is extracted and dumped. The 1.06 µm residual is then frequency-doubled in a PPKTP SHG stage to produce the 532 nm green output beam.

Alternatively, in yet another embodiment (not shown), the 1.06 µm fundamental can be used directly to produce 532 nm green light. In this case, the red output beam can be produced by supplying a portion of the generated 532 nm output to a PPKTP or PPRTA OPO, which produces an output signal tunable over the 628 nm region to yield the red output, as well as idler output at 3.5 µm, which is discarded as before. The portion of the 532 nm pump light that is not converted to a signal/idler beam in the OPO provides the green output beam.

In yet another embodiment (not shown), a blue output beam at 445 nm can be produced from the 1.06 µm fundamental wavelength instead of the 1.34 µm fundamental wavelength described above. In this case, 1.534 µm output can be produced from the 1.06 µm fundamental by an OPO and subsequently frequency-doubled by SHG to 767 nm. The 767 nm SHG output is then mixed with the 1.064 µm fundamental, with the 445 nm beam being generated by SFM.

The exemplary RGB laser light source described above using a combination of 1.064 µm and 1.34 µm pump light in combination with nonlinear frequency shifting can be employed in a laser beam projector, as described for example in commonly assigned U.S. patent application Ser. No. 09/319,058.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A compact multi-wavelength solid state laser source capable of producing RGB laser output beams, comprising:
    a solid state laser element comprising Nd:YVO$_4$ and having lasing wavelengths at approximately 1.06 μm and 1.34 μm, the solid state laser defining a center line and having opposing side faces extending substantially parallel to the center line, with pump radiation coupled to the side faces, the solid state laser element further including end faces, with at least one of the end faces comprising a Brewster dispersing prism with twin exit faces formed on opposite sides of the center line of the solid state laser element, and
    two laser cavities formed on opposite sides of the center line, with a first cavity including a first mirror having a high reflectivity at a first of the lasing wavelengths, a first output mirror, and a first portion of the solid state laser element with one of the twin faces of the Brewster dispersing prism disposed in the first cavity, and the second cavity including a second mirror having a high reflectivity at the second of the lasing wavelengths, a second output mirror, and a second portion of the solid state laser element with the other twin face of the Brewster dispersing prism disposed in the second cavity,
    a blue output channel producing the blue laser output beam and including
        a first harmonic crystal receiving laser radiation from the first laser cavity at a wavelength of 1.34 μm and producing a frequency-doubled wavelength of 671 nm, and
        a first nonlinear crystal that combines the laser radiation at the wavelength of 1.34 μm with the frequency-doubled wavelength of 671 nm to produce the blue laser output beam with a sum frequency of 447 nm;
    a red output channel producing the red laser output beam and including
        an optical parametric amplifier receiving laser radiation from the second laser cavity at a wavelength of 1.06 μm and producing a wavelength-shifted wavelength of 1.54 μm, and
        a second nonlinear crystal that combines the laser radiation at the wavelength of 1.06 μm with the wavelength-shifted wavelength of 1.54 μm to produce the red laser output beam with a sum frequency of 628 nm; and
    a green output channel producing the green laser output beam and including
        a second harmonic crystal receiving laser radiation from the second laser cavity at a wavelength of 1.06 μm and producing a frequency-doubled wavelength of 532 nm.

2. The laser of claim 1, further comprising at least one modulator disposed in at least one of the laser cavities.

3. The laser of claim 2, wherein the modulator is a Q-switch.

4. The laser of claim 1, wherein the Brewster dispersion prism is formed integrally with the solid state laser element.

5. The laser of claim 1, wherein the Brewster dispersion prism is formed as a separate element from the solid state laser element and located proximate to an end face of the solid state laser element.

6. The laser of claim 5, further comprising a quarter-wave plate interposed between the Brewster dispersion prism and the end face of the solid state laser element.

7. The laser of claim 5, wherein the Brewster dispersion prism is formed of glass.

8. The laser of claim 1, wherein both end faces of the solid state laser element comprise a respective Brewster dispersing prism.

9. A compact side-pumped solid state laser source capable of producing RGB laser output beams, comprising:
    a solid state laser element having a lasing wavelength at approximately 1.06 μm and defining a longitudinal center line and having opposing side faces extending substantially parallel to the center line, with pump radiation coupled to the side faces, the solid state laser element further including end faces, with one of the end faces comprising a Brewster dispersing prism with twin exit faces formed on opposite sides of the center line of the solid state laser element, and with the other end face comprising a 180° fold prism, and
    a laser cavity including a mirror obliquely disposed and offset to one side of the center line and having a high reflectivity, a semitransparent output mirror obliquely disposed and offset to the other side of the center line, and the solid state laser element,
    wherein the laser beam traverses a first portion of the solid state laser element in a first direction and a second portion of the solid state laser element in a second direction substantially opposite to and parallel to the first direction,
    a blue (B) output channel producing the blue laser output beam and including
        a first optical parametric amplifier receiving the 1.06 μm laser beam and producing a wavelength-shifted wavelength of 1.54 μm,
        a first harmonic crystal receiving the wavelength-shifted wavelength of 1.54 μm and producing a frequency-doubled wavelength of 767 nm, and
        a first nonlinear crystal that combines the laser beam at the wavelength of 1.06 μm with the frequency-doubled wavelength of 767 nm to produce the blue laser output beam with a sum frequency of 445 nm;
    a red (R) output channel producing the red laser output beam and including
        a second optical parametric amplifier receiving the 1.06 μm laser beam and producing a wavelength-shifted wavelength of 1.54 μm, and
        a second nonlinear crystal that combines the laser radiation at the wavelength of 1.06 μm with the wavelength-shifted wavelength of 1.54 μm to produce the red laser output beam with a sum frequency of 628 nm; and
    a green (G) output channel producing the green laser output beam and including
        a second harmonic crystal receiving the 1.06 μm laser beam and producing a frequency-doubled wavelength of 532 nm.

* * * * *